US008752062B2

(12) United States Patent
Schnurr et al.

(10) Patent No.: US 8,752,062 B2
(45) Date of Patent: Jun. 10, 2014

(54) MONITORING OF COMPUTER EVENTS AND STEPS LINKED BY DEPENDENCY RELATIONSHIPS TO GENERATE COMPLETED PROCESSES DATA AND DETERMINING THE COMPLETED PROCESSED DATA MEET TRIGGER CRITERIA

(75) Inventors: Christopher Schnurr, County Londonderry (IE); Frank Maurer, County Donegal (IE)

(73) Assignee: Verint Americas Inc., Melville, NY (US)

( * ) Notice: Subject to any disclaimer, the term of this patent is extended or adjusted under 35 U.S.C. 154(b) by 1605 days.

(21) Appl. No.: 11/723,010

(22) Filed: Mar. 15, 2007

(65) Prior Publication Data

US 2007/0219941 A1 Sep. 20, 2007

Related U.S. Application Data

(60) Provisional application No. 60/783,043, filed on Mar. 17, 2006.

(51) Int. Cl.
*G06F 9/46* (2006.01)
*G06F 17/30* (2006.01)
*G06F 21/55* (2013.01)
*G06F 11/34* (2006.01)

(52) U.S. Cl.
CPC .......... *G06F 21/552* (2013.01); *G06F 11/3438* (2013.01)
USPC .......................................... 718/106; 707/705

(58) Field of Classification Search
None
See application file for complete search history.

(56) References Cited

U.S. PATENT DOCUMENTS

| 5,321,837 | A | * | 6/1994 | Daniel et al. ........................... 1/1 |
| 5,873,107 | A | * | 2/1999 | Borovoy et al. ............... 715/234 |
| 6,081,868 | A | | 6/2000 | Brooks .............................. 711/3 |
| 6,816,858 | B1 | * | 11/2004 | Coden et al. ................... 707/750 |
| 6,868,413 | B1 | * | 3/2005 | Grindrod et al. ................. 706/59 |
| 6,938,082 | B2 | * | 8/2005 | Hirata et al. ................... 709/224 |
| 6,978,303 | B1 | | 12/2005 | McCreesh et al. ............. 709/224 |
| 7,003,781 | B1 | * | 2/2006 | Blackwell et al. ............. 719/327 |
| 7,506,314 | B2 | * | 3/2009 | Kollmann et al. ............ 717/128 |
| 7,653,566 | B2 | * | 1/2010 | Kim et al. ..................... 705/7.13 |
| 7,752,607 | B2 | * | 7/2010 | Larab et al. ................... 717/135 |
| 7,996,853 | B2 | * | 8/2011 | Bendiksen et al. ........... 719/328 |
| 2002/0010726 | A1 | * | 1/2002 | Rogson ......................... 707/533 |

(Continued)

*Primary Examiner* — Meng An
*Assistant Examiner* — Tammy Lee
(74) *Attorney, Agent, or Firm* — Andrus Intellectual Property Law, LLP (57) ABSTRACT

A data processing system (1) is programmed with an interface (2) for capturing events which arise, and a process engine (3) for automatically monitoring captured events to identify completion of steps, each comprising a plurality of events linked by dependency relationships; and to identify completion of processes, each comprising a plurality of steps linked by dependency relationships. Software functions (5) execute in response to output of the process engine (3). The process engine (3) processes events to recognize a plurality of potential steps, but terminates other potential steps when completion of a step is determined. The process engine (3) processes steps to recognize a plurality of potential processes, but terminates other potential process when completion of a process is determined. The dependency relationships include Boolean AND operators and Boolean OR operators. There is a discrete start event for each step and a discrete start step for each process. The engine executes a plurality of processes simultaneously, applying captured events in real time to relevant steps, some events being applied to a plurality of steps.

25 Claims, 3 Drawing Sheets

(56) References Cited

U.S. PATENT DOCUMENTS

| | | | |
|---|---|---|---|
| 2003/0014498 A1* | 1/2003 | Kreidler et al. | 709/217 |
| 2004/0093567 A1* | 5/2004 | Schabes et al. | 715/533 |
| 2004/0162741 A1* | 8/2004 | Flaxer et al. | 705/7 |
| 2004/0167864 A1* | 8/2004 | Wang et al. | 707/1 |
| 2004/0249856 A1* | 12/2004 | Garden et al. | 707/104.1 |
| 2004/0260982 A1* | 12/2004 | Bhowmik et al. | 714/43 |
| 2005/0104858 A1* | 5/2005 | Need et al. | 345/172 |
| 2006/0117271 A1* | 6/2006 | Keim | 715/789 |
| 2006/0143611 A1* | 6/2006 | Sadiq | 718/100 |
| 2006/0259861 A1* | 11/2006 | Watson | 715/705 |
| 2007/0038654 A1* | 2/2007 | Mazzagatti et al. | 707/100 |
| 2007/0039049 A1* | 2/2007 | Kupferman et al. | 726/22 |
| 2009/0030904 A1* | 1/2009 | Gotta et al. | 707/6 |

* cited by examiner

Fig. 1

Step One

| Event 1 (*) |
| Event 2 (°) |
| Event3 and Event4 (^) |
| Event5 or Event6 and not Event7 (`) |
| Event2 or Event3 (¬) |

Example valid data flows

1*,2°,4^,3^,6`,5`,3¬
1*,2°,2°,3^,2^,4^,2^,5`,2`,6`,2¬

Example invalid data flows

1*,2°,4^,1*,3*,6*,5*,2°
1*,2°,2°,3^,2^,4^,2^,5`,2`,6`,7,2

[the suffix item in data flow shows what event is registered by the data flow]

Fig. 2

| Criterion | Operators | Description |
|---|---|---|
| UserGroup | =, !=, ?, ¿ | ID Of agent using the monitored machine |
| ComputerGroup | =, !=, ?, ¿ | ID of monitored Machine |
| Step | =, !=, ?, ¿ | Current step within process engine |
| Process | =, !=, ?, ¿ | Process within process engine |
| Event | =, !=, ?, ¿ | event within process engine |
| Event Value | =, !=, ?, ¿, <, > | Passback event within process engine |

Operators:

| | |
|---|---|
| = | equal to |
| != | Not Equal to |
| ? | contains |
| ¿ | Does not contain |
| < | less than (arithmetic) |
| > | greater than (arithmetic) |

Fig. 5

MONITORING OF COMPUTER EVENTS AND STEPS LINKED BY DEPENDENCY RELATIONSHIPS TO GENERATE COMPLETED PROCESSES DATA AND DETERMINING THE COMPLETED PROCESSED DATA MEET TRIGGER CRITERIA

This is a complete application claiming benefit of provisional 60/783,043 filed Mar. 17, 2006.

INTRODUCTION

The invention relates to automatic detection of processes on computers.

It is known to provide a data processing system in which processes are automatically detected by user interface events, simple examples being opening a window or entering an item of data from a field into a database. Our prior patent number U.S. Pat. No. 6,978,303 describes automatic monitoring of computer usage. Also, U.S. Pat. No. 6,081,868 describes a diagnostic system which monitors events to count cache misses and idle time of processors waiting to access memories.

The invention is directed towards achieving a higher degree of automation in execution of processes triggered by events in the computer.

SUMMARY OF THE INVENTION

According to the invention, there is provided a data processing system comprising a processor, a memory, and a storage device, wherein the processor comprises:
- an interface for capturing, at an operating system level, events which arise in the system,
- a process engine for automatically monitoring captured events to:
  - identify completion of steps, each comprising a plurality of events linked by dependency relationships; and
  - identify completion of processes, each comprising a plurality of steps linked by dependency relationships,
- a trigger engine for executing in response to output of the process engine to trigger software functions;
- a database manager for saving process data generated by the process engine; and
- a reporting engine for generating reports according to the saved data.

In one embodiment, the process engine processes events to simultaneously recognise a plurality of potential steps, and terminates other potential steps when completion of a step is determined.

In one embodiment, the process engine processes steps to simultaneously recognise a plurality of potential processes, and terminates other potential process when completion of a process is determined.

In one embodiment, the dependency relationships include Boolean AND operators.

In one embodiment, the dependency relationships include Boolean OR operators.

In one embodiment, the dependency relationships include Boolean NOT operators.

In one embodiment, there is a discrete start event for each step and a discrete start step for each process.

In one embodiment, the process engine treats a step as current if its start event is received.

In another embodiment, each step has an end event.

In one embodiment, the process engine stores event lists defining the steps and said event lists are stored as mark-up language documents.

In one embodiment, the process engine stores step lists defining the processes and said step lists are stored as mark-up language documents.

In a further embodiment, the mark-up language is XML.

In one embodiment, the trigger engine triggers said software functions according to criteria for process inter-dependencies and rules specifying parameter ranges or thresholds.

In one embodiment, the trigger engine comprises feedback means for generating events and feeding the events to the process engine.

In one embodiment, the process engine comprises means for associating real time stamps with events and with completed processes, and the database manager saves said real time stamps.

In one embodiment, the reporting engine correlates event and process times with a real time axis for display.

In one embodiment, the reporting engine comprises means for generating an output of event data indicating when events, steps, and processes occurred, for generating a graphical user interface allowing a user to configure said events into new steps and to configure said steps into new processes.

In a further embodiment, the interface comprises means for capturing an event by querying an operating system for display controls, receiving a list of controls from the operating system, applying a pattern signature to the returned list to identify a target control, making a query to the operating system concerning the target control, and receiving a response with data for the target control.

In one embodiment, a query is a request for an operating system document object model for a web page interface screen.

In one embodiment, a signature is applied to all objects in the model.

In one embodiment, a query is a request for a visually-impaired accessibility stream output via an API.

In another embodiment, the interface recognises passback events which are not included in steps, but are processed in parallel to provide datagrams to the trigger engine (4) or the database manager.

In one embodiment, the process engine links trails of passback events to provide a log concerning an activity.

In one embodiment, the process engine applies passback event datagrams with notifications of processes being completed.

In another aspect, the invention provides a computer readable medium comprising software for performing operations of any data processing system as defined above when executing on a digital processor.

DETAILED DESCRIPTION OF THE INVENTION

The invention will be more clearly understood from the following description of some embodiments thereof, given by way of example only with reference to the accompanying drawings in which.

DESCRIPTION OF THE EMBODIMENTS

Overview

Figure 1:
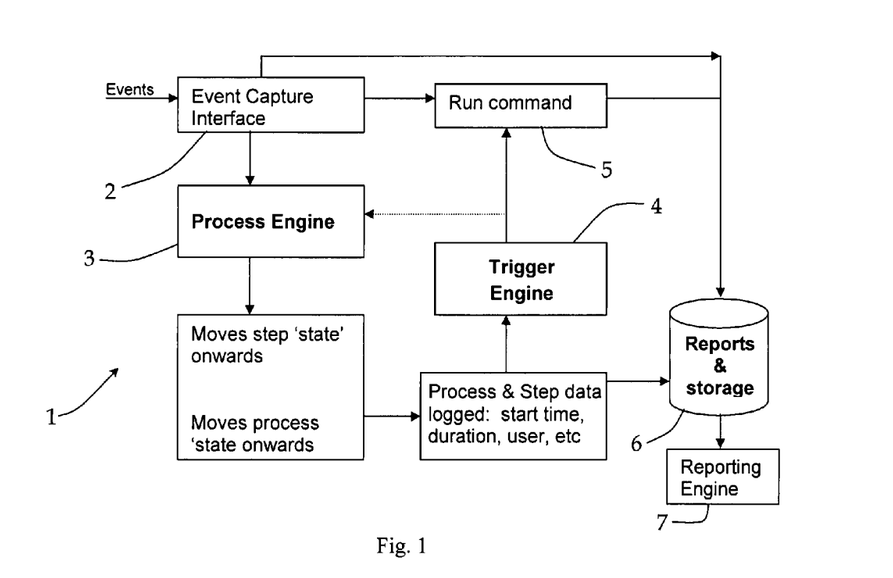
FIG. 1 is a flow diagram for operation of a computer of the invention.

Referring to FIG. 1, a data procession system 1 comprises an interface 2 to capture events which arise in a computer. The events are captured at the operating system level and are universally captured and so they can relate to any type of activity which the computer performs. The interface feeds a process engine 3 which determines progress of the computer through various processes, and a data manager 6 logs state data. The computer also comprises a process trigger system 4 which automatically activates commands 5 in response to determined progress through processes.

A reporting engine 7 draws both raw event data from the interface 2 and process data from the database 6 to generate output reports. These reports can be used to re-configure the settings of the process engine 3.

Events are universally captured at the operating system level, irrespective of the application being executed. For example, it may be a computer controlling a process activity in a factory, for example a chemical reaction vessel. An event can be any change or interaction within the computer, such as:
- a specified data value or keyword appearing in any window title of an application,
- a specified data value or keyword appearing in a specific location on a particular window or set of windows in an application,
- an application being executed,
- an absence of interaction with the computer for a given time period,
- a particular sequence of key strokes,
- a particular mouse click on a specified button, window, form or menu,
- a particular combination of unrelated applications being executed in a particular sequence,
- a particular event being executed a specified number of times,
- a duration of time spent executing a particular application, or
- a duration of time executing a particular application with a particular specified data value appearing in the application window Events are detected across every application running on the computer, and without having to integrate into any other piece of software running on the computer. Also, if the computer has a number of independent systems that do not interface with each other, but all as a whole combine to perform a process, then the interface captures events from all of them and makes the data from each combine to produce a coherent report as to how the different systems combine and interact.

The process engine 3 has a configuration interface for the definition of the events that define the processes being monitored. These may include window open/close, data entered into a field, button or key clicks etc. These event definition rules may be stored in the database 6 or file and will be transmitted to each client computer to allow real-time detection of events. Processes may also include additional value fields which may be populated with data captured during the detection of a process, for example the value of an order or policy or the name of a product.

In summary, as events arise in the computer they are captured by the interface 2, and fed to the process engine 3. The engine 3 is programmed to recognise an event as a start event for a process step. It then activates a step. If it recognises a start event for a different step is activates that step in parallel. It recognises successive events of the steps until a final event for a step is recognised, upon which that step is flagged as complete and the other active steps are terminated. If all of the steps for a process are completed the engine 3 flags that the process is complete. Completion of a process may involve a combination of dependency relationships including Boolean AND, OR, and NOT operators. For example, a process may be regarded as compete if Step A AND (Steps B OR C) AND Step D are completed. A time stamp and a duration are recorded for completion of each step. The run commands 5 include generating notifications for other computer functions such as starting or stopping screen recording, sending email notifications to third party, changing the state of some third party database, and user messages.

The configurations of the processes and of the steps are set by the user. The reporting tool 7 can assist with this by generating outputs of historical events and prompting the user to indicate patterns which are to constitute steps.

The following describes the system in more detail.

Event Capture

Captured events are both fed into the process engine 3 and fed directly to the run commands 5, some of which operate directly in response to occurrence of an event. There is a real time flow of events passing through the process engine 3 which monitors them to recognise the pre-defined steps and processes.

The interface 2 captures an event by querying the operating system for display controls, receiving a list of controls from the operating system, applying a pattern signature to the returned list to identify a target control, making a query to the operating system concerning the target control, and receiving a response with data for the target control. The signatures are stored in a central location and distributed to client computers. A computer may interact with a signature to modify it. Signatures can be exported/imported from one Web server to another to allow replication of signatures without re capture of the original screens. Once new conditions are defined, these are sent from the central location to each remote computer via TCP/IP, and are then stored by the event capture interface 2 in both memory and also in data file storage.

Signatures are generated to filter operating system responses generated in a number of different ways. For Internet Explorer™ (Web-based) applications, each Web page is created in a hierachical form. This allows definition of a Web page irrespective of how the page may change dynamically as the browser displaying the Web page is resized. Where Web pages contain framed page content, each frame is considered its own Web application. Framed pages are also organized in a hierarchical manner to allow exact unique detection of frames within each Web page frame set. Access to the Web page is obtained through calls to obtain the Document Object Model exposed by the Web browser. For 32-bit software applications, objects are obtained through an enumeration process. For such applications which also contain Web browser objects, the operating system 32-bit components are obtained, and the Web browser objects are treated independently, each as its own Web object as described above.

For terminal emulation processes such as client software which interacts with character-based (so-called 'green-screen') mainframe server, the operating system response is built using accessible API calls such as the HLLAPI method.

For Java-based applications or Java-based applets residing on a Web page, the operating system response for the Java interface objects is obtained using accessibility function calls that have been designed to be used for users with limited vision/vision impairments. For other non-standard applications which do not expose their screen signature in any of the above methods, additional detection can be done by interception of windows Graphics Device Interface text calls.

A "passback event" is used to add a contextual item to the step in which this event occurs. A passback event is not an event for a step. A passback event, when encountered by the process engine 3, will illicit a datagram to be sent to the database 6, with the following information:

type: event user, computer, date, time, passback value

The passback value is a formatted string based on the passback values which accompany the trigger condition.

The duration of a passback event is always zero

A passback event may be useful as a contextual indicator for the process that the event is occurring in. The process engine 3 stores a list of all passback events that occur. When the process engine 3 detects that a current process has been completed, this passback event list is sent along with the process completion data. Passback items consist of name/value pairings such as: [Age/65]. Each of these pairs, along with its type (value: integer, string, date, floating point, for example) is stored as a 'tag' for the process that is occurring. This allows identification of which processes contain a specific value: for example, "report on all processes where customer age>65".

Process Engine 3 Identification of Steps

As set out below, a step is defined as a collection of events. It must contain a start event, one or more number of additional event lists, one of which can be termed the end event.

[step: {start event} {event list} . . . {event list}]
[start event: {event}]
[event list: {event} logical operator {event} . . . ]

Figure 2:
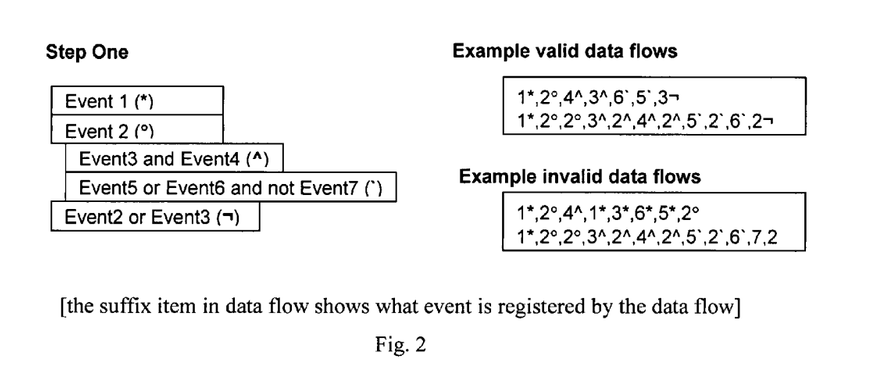
FIG. 2 is a diagram illustrating valid and invalid event sequences.

Referring to FIG. 2 step one starts with Event1. Each subsequent event list is sequential. Each item within each event list is not sequential.

The data flows of FIG. 2 illustrate what state the process engine is in for each event it detects. The second valid data flow illustrates how the process can cope with multiple events (event2) which are apparently out of sequence, and still determine a valid step. In the first invalid data flow, the start event occurs, which resets the step. It then eventually finds event2, and so starts to progress again.

In the second invalid data flow, the 'not Event7' criteria is violated, and the step is abandoned.

Start Event

A start event must be a single event because it starts the process engine's evaluation of the step. Once a start event is encountered, the process engine 3 treats this step as underway. If the step is underway and the exact same start event occurs, then the step will be restarted: thus, a start event cannot recur within the rest of the step. The only exception to this rule is that a start event can also be the last event in a step. The end event for a step may be either an event list, or the start event. Placing the start event within an event list containing other events will cause the step to fail.

There is no limit to the number of steps that can be started on a machine by the same start event. Also, there is no limit to the number of steps that can be started and be 'in process' by the process engine.

Event List

An event list is a collection of events which are combined together within a logical expression. The events within an event list are not sequential: that is, they can happen in any order within the list, and once all have occurred, the event list is deemed to be completed. Each event list is evaluated in a strict order. If a captured event has no match within the current event list, it is ignored. Only after all conditions within the event list have been met will the process engine progress to evaluating the next event list. This allows for a level of flexibility on the approach to matching real time events to the appropriate data stream because events can be forced to be sequential if required, but there is still flexibility included to allow non-sequential events to occur when necessary.

A step is completed when all the criteria for the final event list are met. At this point, the process engine resets, and all step items are completed.

Ending the Step

Once an end event is detected, then all steps are set back to zero, and only this step is noted as having occurred. At this point, the start time of the start event from this step, plus the end time of the end event of this step are logged, and the duration of the step is calculated. This data is fed back to the client for logging in the database, and for additional trigger processing if necessary. The data sent includes: user, computer, date/time stamp, step name, duration. The end of a step contains a data field which determines whether the step has successfully completed or whether it is an incomplete step.

Below is an example of a step in an XML file:

```
<STEP>
    <ID>1</ID>
    <NAME>Step 1</NAME>
    <STARTEVENT>
        <ID>1</ID>
        <CONDITION>AND</CONDITION>
    </STARTEVENT>
    <EVENTLIST>
        <EVENT>
            <ID>2</ID>
            <CONDITION>AND</CONDITION>
        </EVENT>
        <EVENT>
            <ID>3</ID>
            <CONDITION>NOT</CONDITION>
        </EVENT>
    </EVENTLIST>
    <EVENTLIST>
        <EVENT>
            <ID>2</ID>
            <CONDITION>AND</CONDITION>
        </EVENT>
    </EVENTLIST>
    <EVENTLIST>
        <EVENT>
            <ID>4</ID>
            <CONDITION>AND</CONDITION>
        </EVENT>
        <EVENT>
            <ID>5</ID>
            <CONDITION>OR</CONDITION>
        </EVENT>
        <EVENT>
            <ID>6</ID>
            <CONDITION>OR</CONDITION>
        </EVENT>
    </EVENTLIST>
</STEP>
```

There must be a STARTEVENT and one EVENTLIST. Other EVENTLISTS are optional, but there may be numerous EVENTLISTS. There are three conditions you can have AND, NOT and OR.

AND—must be matched.
NOT—must not be matched.
OR—at least one OR needs to be matched.

The start event must be AND conditions. A NOT event cannot appear on its own within a list. An ENDEVENT can be an EVENTLIST or the STARTEVENT.

All current steps are reset if a step completes. A step resets itself if it gets its start event again. A start event may finish its own step (but will also immediately restart).

Process Engine 3 Identification of Processes

An XML data structure is used for the storage and configuration of processes of the process engine 3 in a manner analogous to that for definition of steps.

The process engine 3 retains the list of steps that are being fulfilled as the process continues. When the process completes (i.e. when the end step criteria is fulfilled), the list of steps that have occurred are sent with the process completion. This allows the process to be 'tagged' with the actual sequence of steps that have occurred. This is required to allow distinction between two instances of the same process being completed but using different sets of steps along the way.

A process may contain a start step, followed by any number of steps.

[process: {start step} {step list} . . . {step list}]
[start step: {step}]
[step list: {step} logical operator {step} . . . ]

The start step is equivalent in definition and operation to the start event. The step list is equivalent in definition and operation to the event list When a process ends, this data is fed back in a similar manner to the end of a step. The end of a process contains a data field which determines whether the process has successfully completed or whether it is an incomplete process.

When the process is ended, any variables that have been detected and marked as being significant to the process are collected and sent as name value pairs along with the completed process details.

While evaluating steps and processes, the process engine 3 continues to evaluate the flow of events against all possible steps and processes. This means that at any point during its operation, there could be any number of processes being evaluated as potentially the correct item. Only once the final step for this process is completed, the process engine can determine the exact process that has occurred. However, during the evaluation of the event flow, the process engine keeps a track of all steps and processes that are currently being evaluated. As soon as one of the processes is detected as being completed, all other processes are marked as being abandoned. At this point, a Process Completed data item is recorded against the one process that has been completed. A Process Abandoned data item is recorded against all the other processes that are still being evaluated at this point.

Similarly as above, for steps as well as processes, as soon as one of the steps is detected as being completed, all other steps or processes are marked as being abandoned. At this point, the Step Completed data item is logged against the one step that has been completed. The Step Abandoned data item is logged against all the other steps that are still being evaluated at this point.

A process is deemed to be in its 'started' state as soon as its start step has been completed. If, after this point, the started step is encountered again, then the process will be reset back to the started state. If this reset occurs during the process, then this process is deemed to have been restarted, and a PROCESS_RESET data item will be logged, followed by a PROCESS_STARTED data item. If this start step is also the end step of a process, then a PROCESS_COMPLETED data item will be logged, and immediately afterwards a PROCESS_STARTED data item will be logged. A process reset only affects its own process. No other processes that may be in a started state will be affected by a process reset.

A step is deemed to be in its 'started' state as soon as its start event has been captured. If, after this point, the start event is encountered again, then the step will be reset back to the started state. If this reset occurs during the step, then this step is deemed to have been restarted, and a STEP_RESET data item will be logged, followed by a STEP_STARTED data item. If this start event is also the end event of a step, then a STEP_COMPLETED data item will be logged, and immediately afterwards a STEP_STARTED data item will be logged. A step reset only affects its own step. No other steps that may be in a started state will be affected by a step reset.

Process and Step States

The process engine reports the state of the process or step each time it detects a change to its state. The detected states comprise a list including:

STEP_STARTED—zero duration, timestamp logged

STEP_COMPLETED—duration since STEP STARTED logged, timestamp logged

STEP_ABANDONED—duration since STEP_STARTED logged, timestamp logged

STEP_RESET—duration since STEP_STARTED logged, timestamp logged

PROCESS_STARTED zero duration, timestamp logged

PROCESS_COMPLETED—duration since PROCESS_STARTED logged, timestamp logged

PROCESS_ABANDONED—duration since PROCESS_STARTED logged, timestamp logged

PROCESS_RESET—duration since PROCESS_STARTED logged, timestamp logged

Logical Operators

The supported logical operators are: AND, OR, NOT. Within an event list or a step list, each item can be linked by a logical operator. An event list cannot contain nested operators.

Having a NOT as the only item in a list will mean that this step will get evaluated correctly any time any event other than the one in the NOT clause occurs. This therefore has little use as a single item. It is recommended to use the NOT clause to join two items within an event list rather than having a single item on its own.

Each process must have a unique start and end step. The start step cannot appear anywhere else within the process. A step may appear more than once within the process as long as it is not a start step. Below is an example of a process in the xml file:

```
<PROCESS>
    <ID>1</ID>
    <NAME>Process 1</NAME>
    <STARTSTEP>
        <ID>1</ID>
        <CONDITION>AND</CONDITION>
    </STARTSTEP>
    <STEPLIST>
        < PSTEP >
            <ID>3</ID>
            <CONDITION>AND</CONDITION>
        </ PSTEP >
    </STEPLIST>
    <STEPLIST>
        < PSTEP >
            <ID>2</ID>
            <CONDITION>AND</CONDITION>
        </ PSTEP >
        < PSTEP >
            <ID>3</ID>
            <CONDITION>OR</CONDITION>
        </ PSTEP >
```

-continued

```
    < PSTEP >
        <ID>4</ID>
        <CONDITION>OR</CONDITION>
    </ PSTEP >
</STEPLIST>
</PROCESS>
```

There must be a STARTSTEP and STEPLIST. Other STEPLISTS are optional, but there may be numerous STEPLISTS. There are three conditions you can have AND, NOT and OR.

AND—must be matched.

NOT—must not be matched.

OR—at least one OR needs to be matched.

The start and end step must be AND conditions. A NOT step cannot appear on its own within a list.

All processes are reset if a process completes. A process resets itself if it gets its start step again.

The system 1 also operates to detect processes in data previously recorded. In this case, the process engine 3 is sent a data stream of events from a specified data storage facility. The process engine captures events from the storage device and generates the process and step data in response to these events, for automatically triggering processes in response to events Process Trigger System The process trigger system 4 executes on the computer and monitors the process stream created by the process engine 3. If a process trigger criteria is met, then the process trigger system 4 will initiate a trigger command similar to standard triggers.

Trigger Criteria

Figure 3:
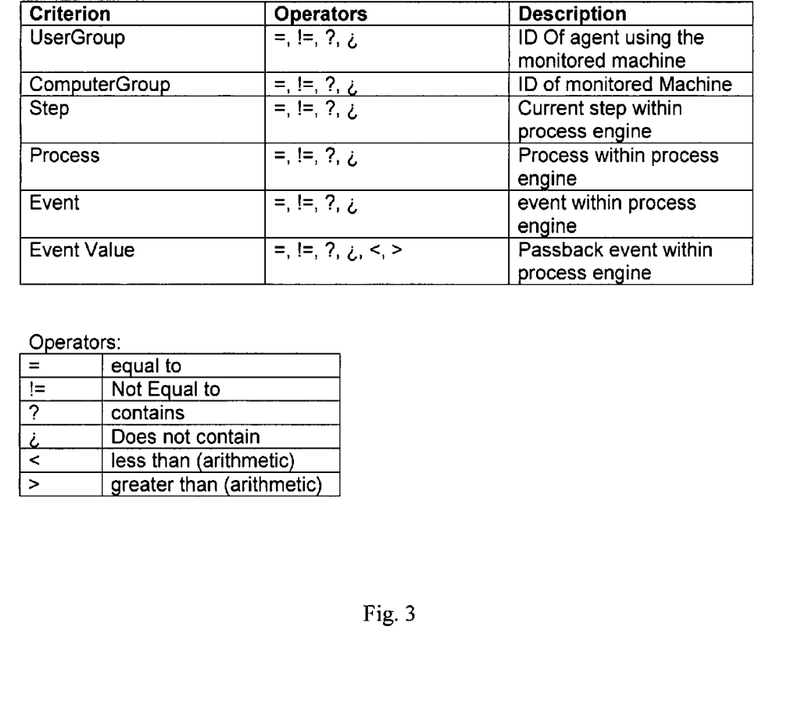
FIG. 3 is a table of criteria for triggering processes.

Valid criteria for triggering off process and event data flows are detailed in FIG. 3.

Trigger Operation

Process triggers allow for expiry and dependency triggers. This allows a user to designate:

Trigger B to fire nnn minutes after Trigger A has fired (expiry trigger)

Trigger B to fire only if Trigger A has fired first (dependency trigger)

Trigger B to fire only after the Trigger B condition has been met previously a number (nnn) of times (threshold trigger)

Trigger Output

A process trigger can fire an executable 5 on the client, or on a server machine. The executable is called with a configurable set of parameters as command line arguments. A process trigger can also fire any one of a set of internal API calls within the trigger system, which may change the operation of the monitoring client.

Trigger Feedback to Process Engine

A process trigger can also be an event trigger. This allows for more complex process definition and additional development of processes to be controlled by their own data.

Figure 4A:
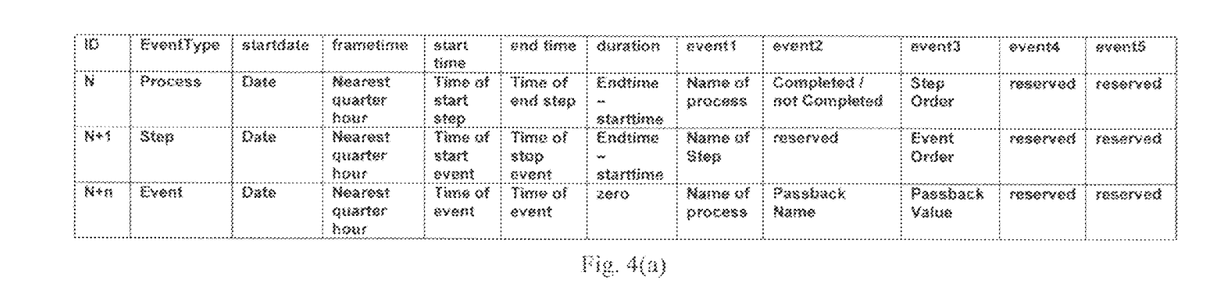
FIGS. 4(a) and 4(b) are representation of how events, steps, and processes are stored.

Data for all passback events, steps, and processes are stored within the event_log table as shown in FIG. 4(a). The step order is the order in which the steps were completed during the process, as described above. The event order is the order in which each event was completed during each step, also as described above.

Figure 4B:
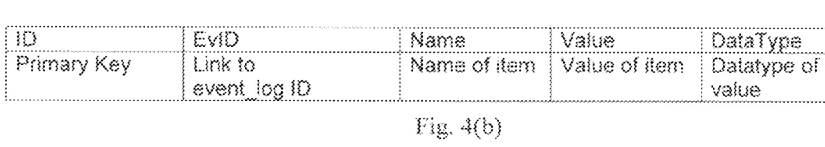

Additional context information is stored in the EvContext_List, as shown in FIG. 4(b).

Reporting Engine 7 Operation

Figure 5:
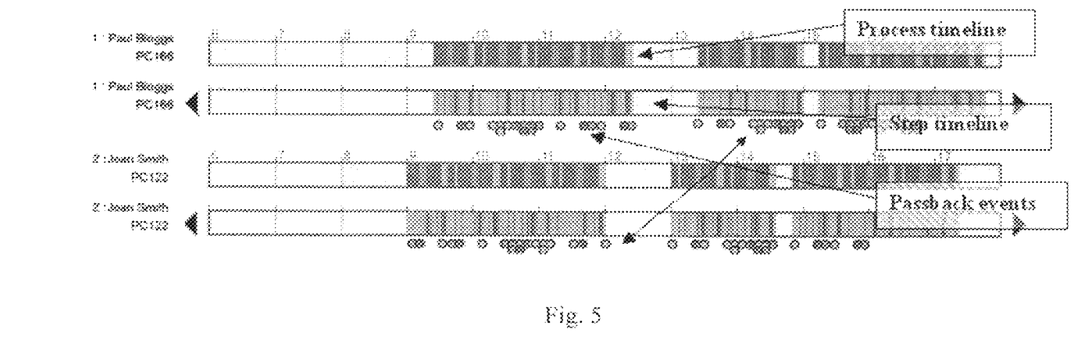
FIG. 5 is a sample timeline graph.

Using this information, a report function can generate Gantt timelines for each of these items, adding additional context as required. FIG. 5 shows a sample timeline graph.

The timeline graph allows for display of contiguous items across multiple horizontal bars. In the example above, we display Process as the first bar, Step as the second bar, and Passback events as zero duration circles. The timeline graph is an interactive object: clicking on the graph will zoom into the specified data by increasing the granularity of the time scale. Additional information is displayed via tooltips to display distinct process, step or event name/and/or value information.

Any number of timeline bars may be displayed per user, depending on the data to be displayed (for example, top bar could display processes where a certain step occurs, next bar could display steps of a different type, a third bar could show PC usage data, a fourth could show telephony data, and so on.

The reporting engine 7 illustrates the event, step or process progression within a flow path diagram. A flow path will start at the user specified start event, step or process plotted on the chart and the system will automatically plot the events, steps or processes linked to this and link the connecting points within the flow diagram based on the sequence each step, event or process was detected. Each link is displayed with a different thickness or colour, depending upon the amount of times this particular work flow path has occurred within the parameters of the displayed report. The thickness of the line is a logarithmic representation of the proportion of times the particular route of the path has been completed. The colour of the line is a representation of value of importance that is specified for this particular process flow.

The reporting engine 7 further comprises a facility to report statistical measures based on detected processes and events. Statistical measures so reported include multivariate regression based on the different process and step durations both between subjects for a single time period and within subjects for a longitudinal time period. Additional reporting allows for the display of standard deviations, means, variance and similar probabilistic distribution statistical scores for the different steps and processes so defined.

The reporting engine 7 further comprises a facility to simulate the process engine 3 on a set of captured data without changing the underlying data to allow definition of a process based on trial and error against real data. By generating representations of historical events the user can define configurations of events for steps and of steps for processes.

Advantages of the process engine 3 include the fact that it reduces the labour and time costs for retrieval and storage of data. It finds application in:

reporting on adherence to a business process policy or set of rules reporting actual workflow instead of 'best case' workflow identifying business processes identifying deviation from business processes in real time labour-intensive time and motion studying of business processes is no longer required allowing target-based reporting of best-case work flow against actual work flow identifying and incorporating real user behaviour into business process modelling allowing for trial and error definition of business processes based on actual recorded data The invention is not limited to the embodiments described but may be varied in construction and detail.

The invention claimed is:

1. A data processing system comprising a processor, a memory, and a storage device, wherein the processor comprises:
    an interface for capturing user interaction events which arise in the system,
    a process engine for automatically monitoring the user interaction events to:
        identify completion of steps, each of the steps comprising a plurality of events of the user interaction events, wherein the plurality of events are linked by a first set of dependency relationships; and
        identify completion of processes, each of the processes comprising a plurality of the steps, wherein the plurality of steps are linked by a second set of dependency relationships,
        generate process data from the completed processes for transference to a trigger engine;
    the trigger engine for receiving and processing the process data to:
        determine whether at least one of the completed processes meet one of a plurality of trigger criteria;
        in response to the at least one of the completed processes meeting a trigger criteria, call a software function;
    a database manager for saving the process data generated by the process engine;
    a reporting engine for generating reports according to the saved process data, wherein the process engine processes the user interaction events to simultaneously recognize a plurality of potential steps, wherein each potential step is a step that may result from additional user interaction events that have not yet been identified, and, once a completed step has been identified from the plurality of potential steps, abandons the remaining potential steps of the plurality of potential steps.

2. The data processing engine as claimed in claim 1, wherein the process engine processes the steps to simultaneously recognise a plurality of potential processes, wherein each potential process is a process that may result from additional steps that have not yet been identified, and, once a completed step has been identified from the plurality of potential steps, abandons the remaining potential processes.

3. The data processing system as claimed in claim 1, wherein the process engine processes the user interaction events to simultaneously recognise a plurality of potential steps, and abandons other potential steps when completion of a step is determined; and wherein the first and second set of dependency relationships include Boolean AND operators.

4. The data processing system as claimed in any of claim 1, wherein the process engine processes the user interaction events to simultaneously recognise a plurality of potential steps, and abandons other potential steps when completion of a step is determined; and wherein the first and second set of dependency relationships include Boolean OR operators.

5. The data processing system as claimed in any of claim 1, wherein the process engine processes the user interaction events to simultaneously recognize a plurality of potential steps, and abandons other potential steps when completion of a step is determined; and wherein the first and second set of dependency relationships include Boolean NOT operators.

6. The data processing system as claimed in claim 1, wherein there is a discrete start event for each step and a discrete start step for each process.

7. The data processing system as claimed in claim 6, wherein the process engine treats a step as current if its start event is received.

8. The data processing system as claimed in claim 1, wherein each step has an end event.

9. The data processing system as claimed in claim 1, wherein the process engine stores event lists defining the steps and said event lists are stored as mark-up language documents.

10. The data processing system as claimed in claim 1, wherein the process engine stores step lists defining the processes and said step lists are stored as mark-up language documents.

11. The data processing system as claimed in claim 9, wherein the markup language is XML.

12. The data processing system as claimed in claim 1, wherein the criteria comprises criteria for process interdependencies and rules specifying parameter ranges or thresholds.

13. The data processing system as claimed in claim 1, wherein the trigger engine comprises feedback means for generating events and feeding the events to the process engine.

14. The data processing system as claimed in claim 1, wherein the process engine comprises means for associating real time stamps with events and with completed processes, and the database manager saves said real time stamps.

15. The data processing system as claimed in claim 1, wherein the reporting engine correlates event and process times with a real time axis for display.

16. The data processing system as claimed in claim 1, wherein the reporting engine correlates event and process times with a real time axis for display; and wherein the reporting engine comprises means for generating an output of event data indicating when events, steps, and processes occurred, for generating a graphical user interface allowing a user to configure said events into new steps and to configure said steps into new processes.

17. The data processing system as claimed in claim 1, wherein the interface comprises means for capturing an event by querying an operating system for display controls, receiving a list of controls from the operating system, applying a pattern signature to a returned list to identify a target control, making a query to the operating system concerning the target control, and receiving a response with data for the target control.

18. The data processing system as claimed in claim 1, wherein the interface comprises means for capturing a user interaction event by querying an operating system for display controls, receiving a list of controls from the operating system, applying a pattern signature to a returned list to identify a target control, making a query to the operating system concerning the target control, and receiving a response with data for the target control; and wherein a query is a request for an operating system document object model for a web page interface screen.

19. The data processing system as claimed in claim 18, wherein the pattern signature is applied to all objects in the operating system document object model.

20. The data processing system as claimed in claim 1, wherein the interface comprises means for capturing a user interaction event by querying an operating system for display controls, receiving a list of controls from the operating system, applying a pattern signature to the returned list to identify a target control, making a query to the operating system concerning the target control, and receiving a response with data for the target control; and a query is a request for a visually-impaired accessibility stream output via an API.

21. The data processing system as claimed in claim 1, wherein the interface recognizes passback events which are not included in steps, but are processed in parallel to provide data grams to the trigger engine or the database manager.

22. The data processing system as claimed in claim 21, wherein the process engine links trails of passback events to provide a log concerning an activity.

23. The data processing system as claimed in claim 20, wherein the process engine applies passback event datagrams with notifications of processes being completed.

24. A non-transitory computer readable medium comprising software for performing operations of a data processing system when executing on a digital processor, a number of steps are carried out, comprising:
    capturing user interaction events which arise in the system with an interface;
        automatically monitoring the user interaction events with a process engine to effectuate the steps of:
        identifying completion of steps, each of the steps comprising a plurality of events of the user interaction events, wherein the plurality of events are linked by a first set of dependency relationships; and
        identifying completion of processes, each of the processes comprising a plurality of the steps, wherein the plurality of steps are linked by a second set of dependency relationships,
        generating process data from the completed processes for transference to a trigger engine;
    the trigger engine for receiving and processing the process data to effectuate the steps of:
        determining whether at least one of the completed processes meet one of a plurality of trigger criteria;
        in response to the at least one of the completed processes meeting a trigger criteria, calling a software function;
    saving the process data generated by the process engine with a database manager; and
    generating reports according to the saved process data with a reporting engine, wherein the process engine processes the steps to simultaneously recognise plurality of potential processes, wherein each potential process is a process that may result from additional steps that have not yet been identified, and, once a completed step has been identified from the plurality of potential steps, abandons the remaining potential processes.

25. A data processing system comprising a processor, a memory, and a storage device, wherein the processor comprises:
    an interface for capturing user interaction events which arise in the system,
    a process engine for automatically monitoring the user interaction events to:
        identify completion of steps, each of the steps comprising a plurality of events of the user interaction events, wherein the plurality of events are linked by a first set of dependency relationships; and
        identify completion of processes, each of the processes comprising a plurality of the steps, wherein the plurality of steps are linked by a second set of dependency relationships,
        generate process data from the completed processes for transference to a trigger engine;
    the trigger engine for receiving and processing the process data to:
        determine whether at least one of the completed processes meet one of a plurality of trigger criteria;
        in response to the at least one of the completed processes meeting a trigger criteria, call a software function;
    a database manager for saving the process data generated by the process engine;
    a reporting engine for generating reports according to the saved process data, wherein the process engine processes the user interaction events to simultaneously recognise a plurality of potential steps, and abandons other potential steps when completion of a step is determined; and wherein the first and second set of dependency relationships include Boolean AND operators.

* * * * *